(12) United States Patent
George et al.

(10) Patent No.: US 12,265,391 B1
(45) Date of Patent: Apr. 1, 2025

(54) SYSTEMS AND METHODS FOR CONTROLLING DRIVE UNITS OF A MARINE VESSEL TO ENHANCE IMAGING OF A MARINE ENVIRONMENT

(71) Applicant: Brunswick Corporation, Mettawa, IL (US)

(72) Inventors: Trevor George, Savoy, IL (US); Jason S. Arbuckle, Horicon, WI (US); Brennan J. Kelly, Champaign, IL (US)

(73) Assignee: Brunswick Corporation, Mettawa, IL (US)

( * ) Notice: Subject to any disclaimer, the term of this patent is extended or adjusted under 35 U.S.C. 154(b) by 225 days.

(21) Appl. No.: 17/936,541

(22) Filed: Sep. 29, 2022

(51) Int. Cl.
*G05D 1/00* (2024.01)
*B63B 79/15* (2020.01)
*B63B 79/40* (2020.01)
*B63H 20/12* (2006.01)
*G06V 20/58* (2022.01)

(52) U.S. Cl.
CPC ........... *G05D 1/0206* (2013.01); *B63B 79/15* (2020.01); *B63B 79/40* (2020.01); *B63H 20/12* (2013.01); *G06V 20/58* (2022.01)

(58) Field of Classification Search
CPC ...... G05D 1/0206; B63B 79/15; B63B 79/40; B63H 20/12; G06V 20/58
See application file for complete search history.

(56) References Cited

U.S. PATENT DOCUMENTS

| | | | |
|---|---|---|---|
| 7,476,862 B2 | 1/2009 | Staerzl | |
| 8,299,956 B1 * | 10/2012 | Friesel | G05D 1/0206 342/41 |
| 9,544,491 B2 | 1/2017 | Pryszo et al. | |
| 10,372,976 B2 | 8/2019 | Kollmann et al. | |
| 10,549,694 B2 | 2/2020 | Murad et al. | |
| 10,931,934 B2 | 2/2021 | Richards et al. | |

(Continued)

FOREIGN PATENT DOCUMENTS

| | | | | |
|---|---|---|---|---|
| EP | 3957558 A1 * | 2/2022 | ............. | B63B 49/00 |
| WO | WO-2005085904 A2 * | 9/2005 | ......... | B62D 15/0285 |
| WO | WO-2021252982 A1 * | 12/2021 | ............. | B63B 49/00 |

OTHER PUBLICATIONS

YouTube video "Manoeuvring with Azipods—turning in independent mode" Nov. 28, 2020, https://youtu.be/DhGYpgm-NOM?si=poelUz9OQde7M6kt 6.08 minutes (Year: 2020).*

(Continued)

*Primary Examiner* — Michael V Kerrigan
*Assistant Examiner* — Tanya C Sienko
(74) *Attorney, Agent, or Firm* — Andrus Intellectual Property Law, LLP

(57) ABSTRACT

A propulsion control system for a marine vessel includes at least one image sensor positioned on the marine vessel and configured to image an area behind the marine vessel, and multiple drive units configured to propel the marine vessel. Each of the drive units is steerable about a vertical steering axis. The propulsion control system further includes a controller configured to receive a prompt to perform an obstacle clearance procedure, and in response to the prompt, steer at least one of the drive units about its vertical steering axis to increase visibility of the area behind the marine vessel by the at least one image sensor.

20 Claims, 8 Drawing Sheets

(56) References Cited

U.S. PATENT DOCUMENTS

| | | |
|---|---|---|
| 11,059,549 B2 | 7/2021 | Terada et al. |
| 11,198,494 B2 | 12/2021 | Derginer et al. |
| 2009/0276148 A1* | 11/2009 | Arvidsson .............. B63H 25/42 |
| | | 441/89 |
| 2019/0147623 A1* | 5/2019 | Tsuchiya ................... G06T 7/30 |
| | | 702/85 |
| 2020/0298941 A1 | 9/2020 | Terada et al. |
| 2021/0269128 A1* | 9/2021 | Rivers ..................... B63B 79/40 |

OTHER PUBLICATIONS

Wikipedia entry "Azipod" downloaded from The Wayback Machine (Jul. 17, 2022 scan) (Year: 2022).*

Wikipedia entry "Azimuth thruster" downloaded from The Wayback Machine (Aug. 12, 2022 scan) (Year: 2022).*

* cited by examiner

SYSTEMS AND METHODS FOR CONTROLLING DRIVE UNITS OF A MARINE VESSEL TO ENHANCE IMAGING OF A MARINE ENVIRONMENT

FIELD

The present disclosure generally relates to controlling positions of drive units configured to propel a marine vessel, and more particularly to methods and systems for controlling the positions of the drive units to enhance the imaging capabilities of image sensors on the marine vessel.

BACKGROUND

The following U.S. Patents and Patent Publications provide background information and are incorporated herein by reference, in entirety:

U.S. Pat. No. 7,476,862 discloses a method for detecting a source of heat near a vessel. Two sensor units are mounted on opposite sides of a transom of a boat and directed to a common location behind the boat. The field of view of the two sensors overlaps behind the marine propulsion unit of the boat to detect the presence of a heat emitting object, such as a mammal. Housing structures contain infrared sensing elements, lenses, and light shields. Signals from four infrared sensing elements are received by a controller which reacts, with an alarm signal, when at least two of the four sensors detect a heat emitting object within their individual fields of view. False triggering can be reduced by not providing an alarm signal if only the two most inboard sensors detect the heat emitting object.

U.S. Pat. No. 9,544,491 discloses a display device for controlling a remotely controlled camera. The display device comprising an image receiver configured to receive an image of the image stream from the camera, and a processor. The processor including a retriever configured to retrieve a selected buffered image corresponding to a data insufficiency region within a target field of view while adjusting the camera from a current field of view to the target field of view until the image stream from the camera includes the insufficiency region being depicted within the target field of view and a depicter configured to depict the selected buffered image on the display device at least in the insufficiency region.

U.S. Pat. No. 10,372,976 discloses an object detection system for a marine vessel having at least one marine drive includes at least one image sensor positioned on the marine vessel and configured to capture an image of a marine environment on or around the marine vessel, and a processor. The object detection system further includes an image scanning module executable on the processor that receives the image as input. The image scanning module includes an artificial neural network trained to detect patterns within the image of the marine environment associated with one or more predefined objects, and to output detection information regarding a presence or absence of the one or more predefined objects within the image of the marine environment.

U.S. Pat. No. 10,931,934 discloses that a watercraft may include a safety system having an imaging component and a control component. The control component may modify the operation of the watercraft based on images from the imaging component. The imaging component may include a thermal imaging component and a non-thermal imaging component. The watercraft may include more than one imaging component disposed around the periphery of the watercraft to monitor a volume surrounding the watercraft for objects in the water such as debris, a person, and/or dock structures. Operating the watercraft based on the images may include operating propulsion and/or steering systems of the watercraft based on a detected object. The control component may operate the propulsion and/or steering systems to disable a propeller when a swimmer is detected, to avoid detected debris, and/or to perform or assist in performing docking maneuvers. The imaging components may include compact thermal imaging modules mounted on or within the hull of the watercraft.

U.S. Pat. No. 11,059,549 discloses a marine vessel that includes a hull including a cabin, an imager that images a field-of-view shielded region, which is a region in which a marine vessel operator's field of view is obstructed when the marine vessel operator located on an operation seat provided inside the cabin looks around an outside of the marine vessel in a horizontal direction, and a display provided at a position visible from the operation seat and that displays a field-of-view complement image, which is an image of the field-of-view shielded region captured by the imager.

U.S. Pat. No. 11,198,494 discloses a propulsion control system for a marine vessel that includes a plurality of propulsion devices steerable to propel the marine vessel, at least one proximity sensor that determines a relative position of the marine vessel with respect to an object, wherein the at least one proximity sensor has a field of view (FOV). A controller is configured to identify a trigger condition for expanding the FOV of the at least one proximity sensor and control thrust and/or steering position of at least one of the plurality of propulsion devices to expand the FOV of the at least one proximity sensor by inducing a roll movement or a pitch movement of the marine vessel.

U.S. Patent Publication No. 2020/0298941 discloses a marine vessel display device that includes an imager that images surroundings of a vessel body, an image processor that generates a bird's-eye view image based on images captured by the imager, a display provided in the vessel body and that displays the bird's-eye view image, and a controller. The controller is configured or programmed to perform a control to switch an image displayed on the display from the bird's-eye view image to an object image obtained by imaging in a direction toward an object from the vessel body based on object information.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

According to one implementation of the present disclosure, a propulsion control system for a marine vessel is provided. The propulsion control system includes at least one image sensor positioned on the marine vessel and configured to image an area behind the marine vessel and multiple drive units configured to propel the marine vessel. Each of the drive units is steerable about a vertical steering axis. The propulsion control system further includes a controller configured to receive a prompt to perform an obstacle clearance procedure; and in response to the prompt, steer at least one of the drive units about its vertical steering axis to increase visibility of the area behind the marine vessel by the at least one image sensor.

According to another implementation of the present disclosure, a method for imaging an area behind a marine vessel having multiple drive units is provided. Each of the drive units is steerable about a vertical steering axis and/or trimmable about a horizontal trim axis. The method includes receiving a prompt to perform an obstacle clearance procedure, and in response to the prompt, operating at least one of the drive units to steer about its vertical steering axis and/or trim about its horizontal trim axis to increase visibility of an area behind the marine vessel by at least one image sensor positioned on the marine vessel and configured to image the area behind the marine vessel.

Various other features, objects, and advantages of the invention will be made apparent from the following description taken together with the drawings.

BRIEF DESCRIPTION OF THE DRAWINGS

The present disclosure is described with reference to the following Figures.

DETAILED DESCRIPTION

As the size of consumer marine vessels has increased, the operators of such vessels are positioned farther from the drive units that provide propulsion to the vessels. Since the operators may not be able to see and manually confirm that the drive units are clear of obstacles (e.g., dock structures, debris in the water) prior to startup, such vessels increasingly incorporate imaging systems that provide information to the operator regarding the conditions on and around the marine vessel. For example, an imaging system may include image sensors (i.e., cameras) that provide images of the area behind the marine vessel to permit an operator to confirm that there are no obstructions that would imperil startup of the drive units. Such imaging systems may also provide critical safety functions for the marine vessel by permitting the operator to ensure that no persons are swimming within a range of the drive units such that startup of propellers could result in injury or death.

However, the usefulness of the images provided by the imaging systems is dependent on the capability of the image sensors to provide a complete image of the relevant area behind the marine vessel. A "complete" image may be an image that is free of blind spots (i.e., portions of the image that are blocked from imaging by the image sensors). The presence and locations of blind spots in the image of the area behind the marine vessel may be affected by various factors, including the number of image sensors, the image sensor mounting locations, the field of view (FOV) characteristics of the image sensors, the number of drive units, the drive unit mounting locations, and the shape of the drive unit cowlings. Although blind spots may be decreased by increasing the number of image sensors mounted on the marine vessel, each additional image sensor adds cost and complexity to the imaging system.

The present inventors have therefore recognized that reduction of blind spots and an increase in visibility of the area behind the marine vessel by the image sensors may be achieved by modifying the positions of the drive units to ensure that the image sensors can image areas that would otherwise be obstructed by the cowling structures of the drive units. The present disclosure thus relates to systems and methods for by controlling steering and/or trim positions steerable and/or trimmable drive units that are mounted on the transom of the marine vessel to increase visibility in the areas surrounding the drive units.

Figure 1:
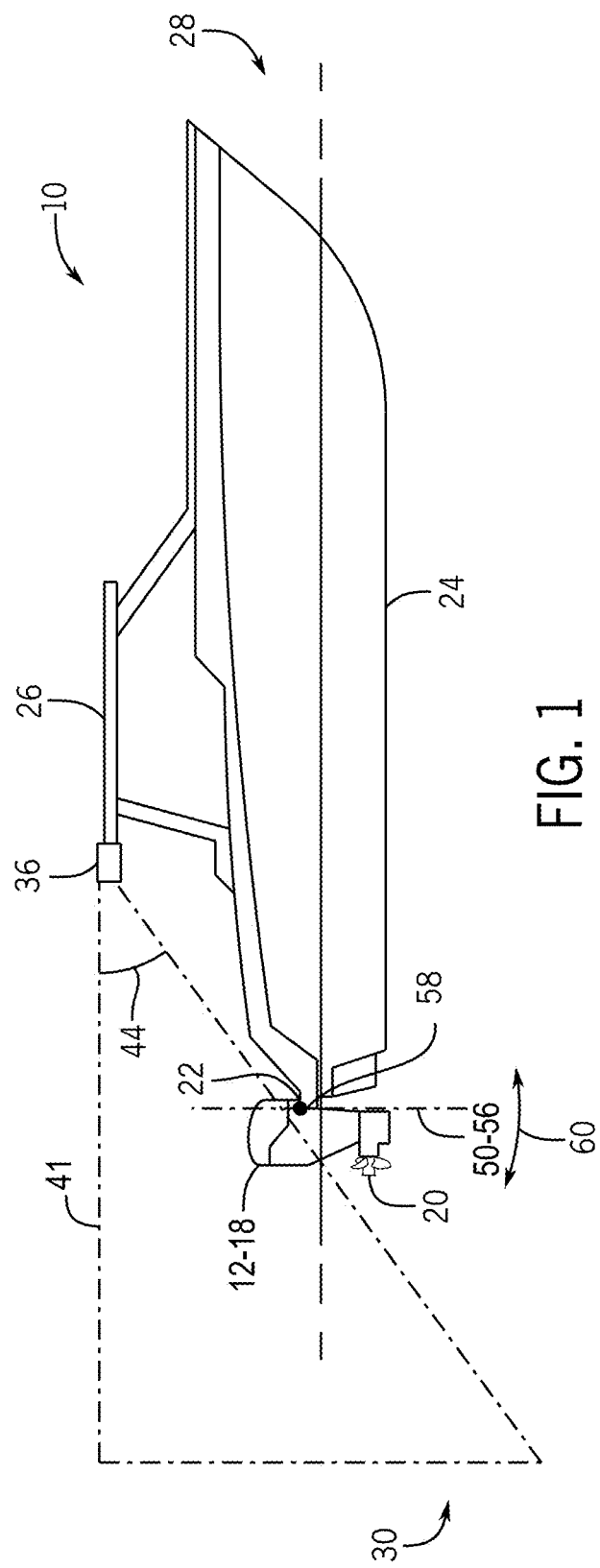
FIG. 1 illustrates a side view of a marine vessel having a propulsion control system including steerable drive units and image sensors.
Figure 2:
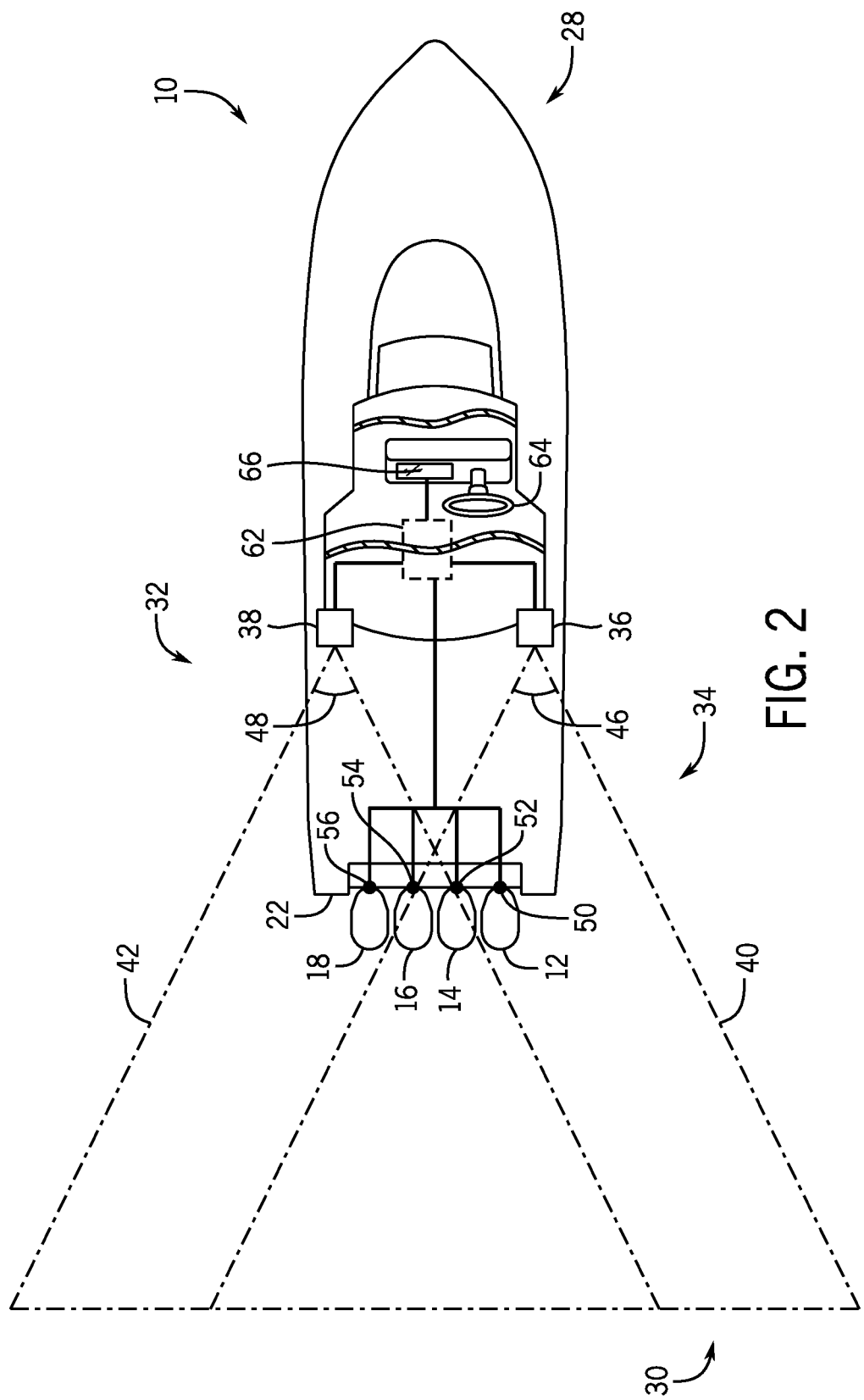
FIG. 2 illustrates a top view of the marine vessel of FIG. 1.

FIGS. 1 and 2 depict side and top views, respectively, of a marine vessel 10 equipped with a propulsion control system configured according to an exemplary embodiment of the disclosure. The marine vessel 10 is shown to extend between a bow end 28 and a stem end 30, and between a port side 32 and a starboard side 34. The propulsion control system of the marine vessel 10 includes multiple drive units 12, 14, 16, 18 positioned at the bow end 28 and coupled to a transom 22 of the vessel hull 24 that produce thrusts to propel the vessel.

The implementation of the marine vessel 10 depicted herein includes four drive units, although the systems and methods of the present invention may be implemented with any number of drive units, and the advantages of such systems and methods to the operation of the marine vessel may correspondingly increase as the number of drive units increases. As illustrated, each of the drive units 12-18 is an outboard motor. The type of outboard motor is not particularly limited, and may include outboard motors that utilize either internal combustion engines or electric motors to drive rotation of a propeller 20 (see FIG. 1).

Each of the drive units 12-18 is independently steerable or rotatable about a vertical steering axis 50, 52, 54, 56 (see FIG. 2) in order to control the direction of the thrust provided by the drive unit. In addition, each of the drive units 12-18 is independently trimmable about a horizontal trim axis 58 (see FIG. 1) and rotatable per the arrow 60 to control a trim angle of the drive units 12-18 relative to the transom 22. A variety of trim angles may be utilized for the drive units 12-18 based on whether the vessel 10 is operating, for example, in a joysticking/docking mode, a high speed/on plane mode, or a transport mode.

The propulsion control system of the marine vessel 10 is also shown to include two image sensors 36, 38 that image the stem end 30 and the area behind the vessel 10. Although the systems and methods described herein are described exclusively with reference to a marine vessel having two image sensors, the systems and methods of the present invention could be utilized with any number of image sensors, including a single image sensor. As depicted in FIGS. 1-7, according to an exemplary embodiment of the present disclosure, the image sensors 36, 38 are mounted on a hardtop structure 26 that extends above the hull 24 and is configured to provide shade and protect the occupants of the vessel 10 from adverse weather conditions. In other embodiments, the image sensors 36, 38 may be mounted on a different structural element to image the stem end 30 and area behind the vessel 10.

Each of the image sensors 36, 38 is configured to image the marine environment on and/or around the marine vessel 102, which may be visual light cameras, an infrared cameras, radar, lidar, etc. or other sensor configured to image of the stem end 30 and area behind the marine vessel 10. The image sensors 36, 38 generate electronic image data that is transmitted to a controller or control unit 62 of the propulsion system (see FIG. 2). The image sensors 36, 38 may be arranged and configured as a stereovision system enabling depth and distance measurements based on pixel disparity. As described in further detail below, once transmitted to the controller 62, the images from the sensors 36, 38 may be combined and processing functions may be performed on the combined image by the controller 62. For example, these processing functions may include identification of blind spots within the combined image, and object detection within the combined image.

The image sensors 36, 38 are shown to have vertical and horizontal field of view (FOV) constraints that represent the maximum area of a subject that the image sensors are able to capture. For example, the vertical FOV 41 of the image sensor 36 (see FIG. 1) may be represented by angle 44 and may be approximately 45° below a horizontal plane extending from the image sensor 36. The horizontal FOV 40, 42 of the image sensors 36 and 38 (see FIG. 2) may be represented by angles 46 and 48 respectively and may each be approximately 45°. As shown, a portion of the FOV 40, 42 of the image sensors 36, 38 overlaps such that certain regions and objects (e.g., drive units 14 and 16) behind the vessel 10 may be imaged by both image sensors 36, 38. In other implementations, the vertical and horizontal FOVs of the sensors 36, 38 may be larger or smaller than those depicted in FIGS. 1-7.

Still referring to FIG. 2, the controller 62 is shown to be communicatively coupled to the drive units 12-18 and the image sensors 36, 38 for the purpose of receiving and sending signals thereto. Controller 62 may be programmable and may include a processor and memory. The controller 62 can be located anywhere in the vessel 10 and can communicate with various components of the vessel 10 via wired and/or wireless links, as will be explained further herein below. Although FIG. 2 shows a single controller 62, the propulsion system can include more than one controller 62. Each controller 62 can have one or more control sections or control units. One having ordinary skill in the art will recognize that the controller 62 can have many different forms and is not limited to the example that is shown and described. For example, here the controller 62 carries out both the obstacle clearance procedure and object detection functions described in further detail below, but in other examples, separate obstacle clearance units and object detection units could be provided.

In some examples, the controller 62 may include a computing system that includes a processing system, storage system, software, and input/output (I/O) interfaces for communicating with devices such as those shown in FIG. 2, and about to be described herein. The processing system loads and executes software from the storage system, such as software programmed with an obstacle clearance control method. When executed by the computing system, the obstacle clearance software directs the processing system to control the steering and/or trim of the drive units 12-18 to improve the ability of the image sensors 36, 38 to capture complete images of the area behind the vessel 10. The computing system may include one or many application modules and one or more processors, which may be communicatively coupled. The processing system can include a microprocessor and other circuitry that retrieves and executes software from the storage system. The processing system can be implemented within a single processing device but can also be distributed across multiple processing devices or sub-systems that cooperate in existing program instructions. Non-limiting examples of the processing system include general purpose central processing units, application-specific processors, and logic devices.

The storage system (e.g., memory) can comprise any storage media readable by the processing system and capable of storing software. The storage system can include volatile and non-volatile, removable and non-removable media implemented in any method or technology for storage of information, such as computer-readable instructions, data structures, program modules, or other data. Non-limiting examples of storage media include random access memory, read only memory, optical discs, flash memory, virtual memory and non-virtual memory, magnetic sets, magnetic tape, magnetic disc storage or other magnetic storage devices, or any other medium which can be used to store the desired information and that may be accessed by an instruction execution system. The storage media can be a non-transitory or a transitory storage media.

In this example, the controller 62 communicates with one or more components of the vessel 10 (e.g., drive units 12-18, image sensors 36, 38) via wired or wireless communications links. The controller 62 is capable of monitoring and controlling one or more operational characteristics of the vessel 10 and its various subsystems by sending and receiving control signals via the communications links. In one example, the communications links are a controller area network (CAN) bus, but other types of links could be used. It should be noted that the extent of the connections shown herein are for schematic purposes only, and not every connection is shown in the drawings for purposes of clarity.

The controller 62 is further shown to be coupled to a steering wheel 64 and a display device 66. The controller 62 is configured to receive steering input from the steering wheel 64. The steering wheel 64 may be utilized in conjunction with a control lever (not shown) that allows the operator to choose to operate the drive units 12-18 of the marine vessel 10 in neutral, forward, or reverse gear. In other implementations, a joystick device may also be utilized in place of or in combination with the steering wheel 64 for steering. The display device 66 may be a touchscreen or other operator input device that can be used to initiate or exit any number of control or operation modes (e.g., an obstacle clearance mode, as described in further detail below with reference to FIGS. 3-7, an autonomous mode). Inputs to the display device 66 can be buttons in the traditional sense or selectable screen icons. The display device 66 can display information about the vessel 10 to the operator of the vessel, such as engine speed, vessel speed, trim angle, propulsion system operating mode, etc. In some implementations, the display device 66 may also include an integrated audible alarm device, for example, to emit an alarm when an object is detected in the image provided by the image sensors 36, 38 proximate one of the drive units 12-18.

Figure 3:
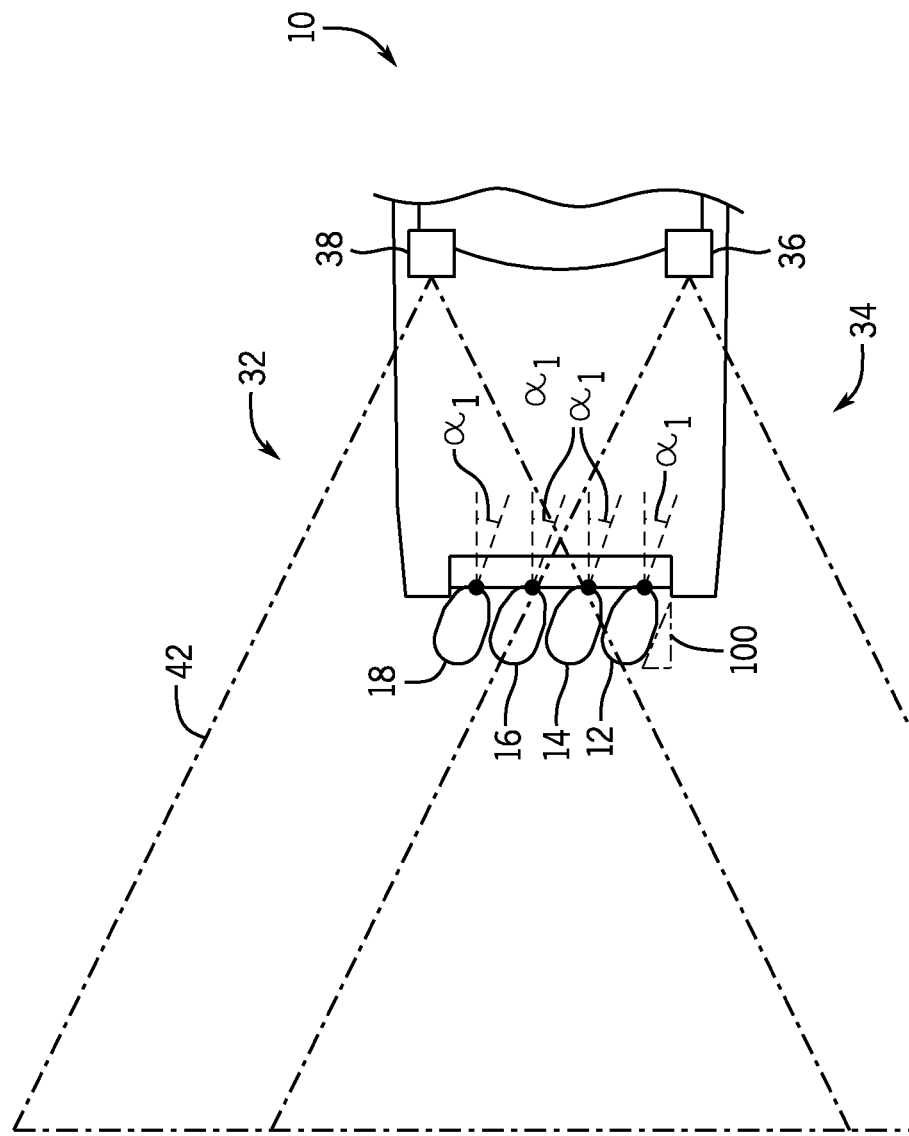
FIGS. 3-7 illustrate the operation of an obstacle clearance procedure using the marine vessel of FIG. 1.

Turning now to FIGS. 3-7, exemplary movement of the drive units 12-18 during an obstacle clearance procedure is depicted. As shown in FIG. 3, the obstacle clearance procedure may commence as the controller 62 commands each of the drive units 12-18 to be simultaneously steered about their respective vertical steering axes 50-56 toward the port side 32 of the marine vessel 10 by a first steering angle $\alpha_1$. In some implementations, the first steering angle $\alpha_1$ may be representative of a maximum steering angle that each of the drive units 12-18 is able to achieve. With the rotation of each of the drive units 12-18 toward the port side 32, area 100 on the starboard side 34 that was previously obscured by the drive unit 12 is able to be imaged by the image sensor 36, and can be incorporated into the image data provided to the controller 62.

Figure 4:
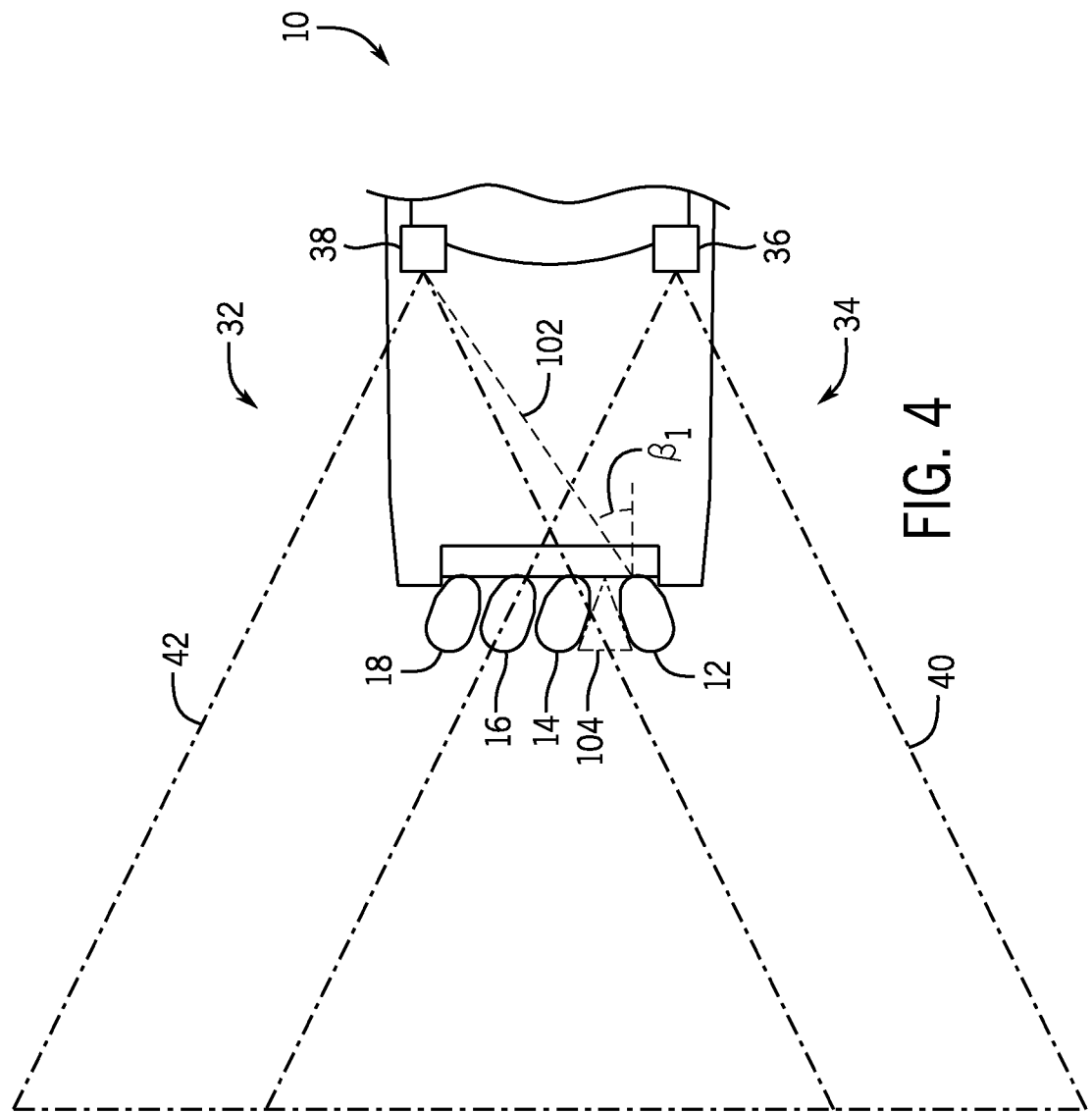

As shown in FIG. 4, the obstacle clearance procedure may continue as drive unit 12 is steered about its vertical steering axis toward the starboard side 34 of the marine vessel 10 by a second steering angle $\beta_1$ such that a longitudinal axis 102 of the drive unit 12 is aligned with the image sensor 38. By aligning the longitudinal axis 102 with the image sensor 38 in this way, a minimal amount of the cowling of the drive unit 12 is imaged by the image sensor 38, and a maximal amount of the area surrounding the drive unit 12 can be imaged. In other implementations, the second steering angle $\beta_1$ may be representative of the maximum steering angle the drive unit 12 is able to achieve. The other drive units 14-18 remain rotated toward the port side 32 by first steering angle $\alpha_1$. With the rotation of the drive unit 12 toward the starboard side 34, area 104 that was previously obscured by the drive units 12 and 14 is able to be imaged by both the image sensors 36 and 38.

Figure 5:
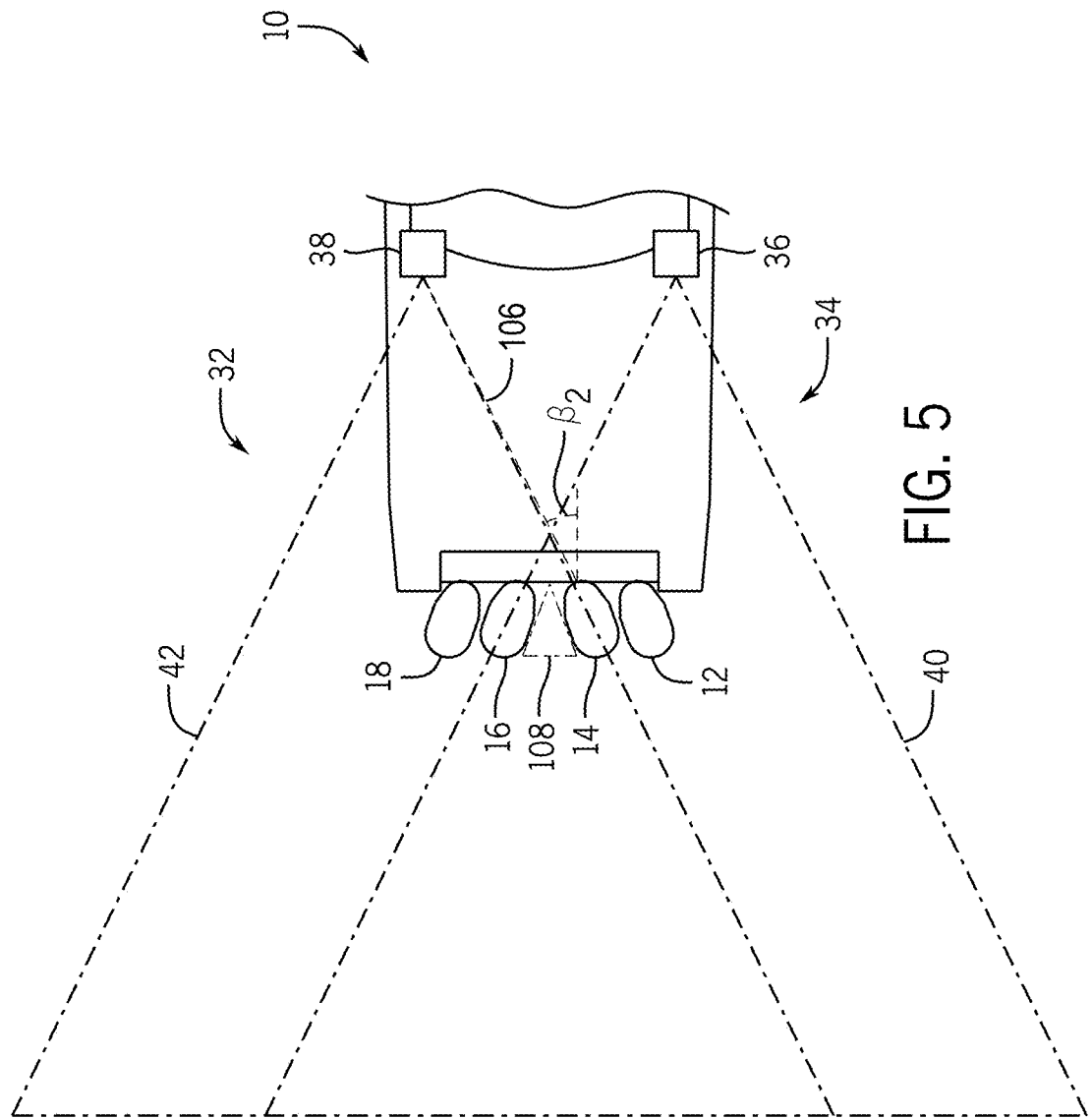
Figure 6:
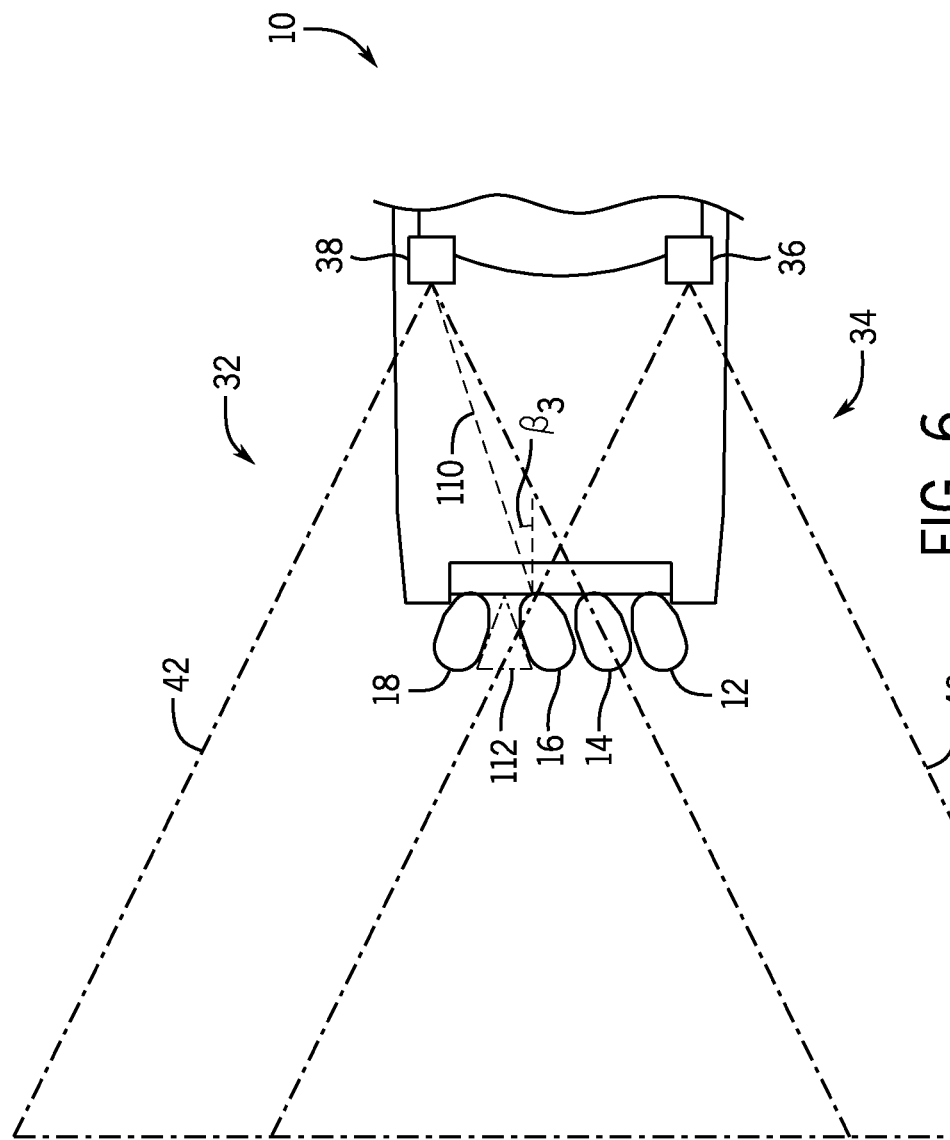
Figure 7:
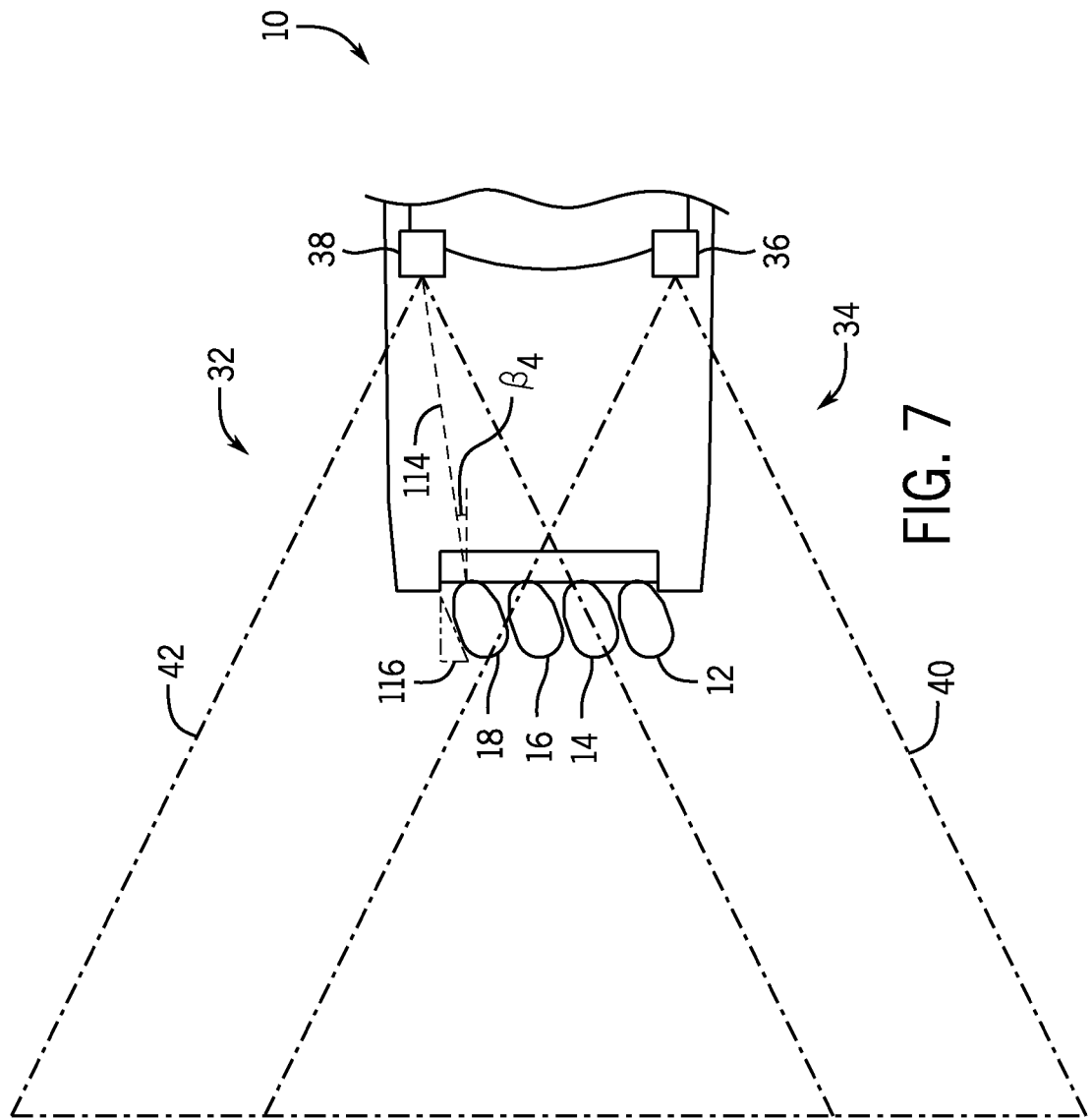

The obstacle clearance procedure further continues as shown in FIG. 5, as drive unit 14 is steered about its vertical steering axis toward the starboard side 34 by its second steering angle $\beta_2$ such that longitudinal axis 106 of the drive unit 14 is aligned with the image sensor 38 and area 108 that was previously obscured by the drive units 14 and 16 is able to be imaged by both the image sensors 36 and 38. Similarly, in FIG. 6, drive unit 16 is steered about its vertical steering axis toward the starboard side 34 by its second steering angle 3 such that longitudinal axis 110 of the drive unit 16 is aligned with the image sensor 38 and area 112 that was previously obscured by the drive units 16 and 18 is able to be imaged by the image sensors 36 and 38. Finally, as shown in FIG. 7, drive unit 18 is steered about its vertical steering axis toward the starboard side 34 by its second steering angle 4 such that longitudinal axis 114 of the drive unit 18 is aligned with the image sensor 38 and area 116 that was previously obscured by drive unit 18 is able to be imaged by image sensor 38.

Although FIGS. 3-7 depict one implementation of an obstacle clearance procedure, numerous variations of the procedure are contemplated and within the scope of the present invention. For example, although FIG. 3 depicts the initial step of the procedure as simultaneous rotation of each of the drive units 12-18 toward the port side 32 of the marine vessel 10, in another implementation, the initial step of the procedure may comprise simultaneous rotation of each of the drive units 12-18 toward the starboard side 34 of the marine vessel 10. In yet another implementation, rather than the initial step of the procedure comprising simultaneous rotation of each of the drive units 12-18, the initial step may comprise sequential rotation, that is, rotation of drive unit 18 toward the starboard side 34, followed by rotation of drive unit 16 toward the starboard side 34, followed by rotation of drive unit 14 toward the starboard side 34, and so on. In still further implementations, the obstacle clearance procedure may include trimming one or more of the drive units 12-18 (e.g., trimming drive unit 12 about the horizontal trim axis 58, see FIG. 1) to increase visibility of the area behind the marine vessel by the image sensors 36, 38.

Figure 8:
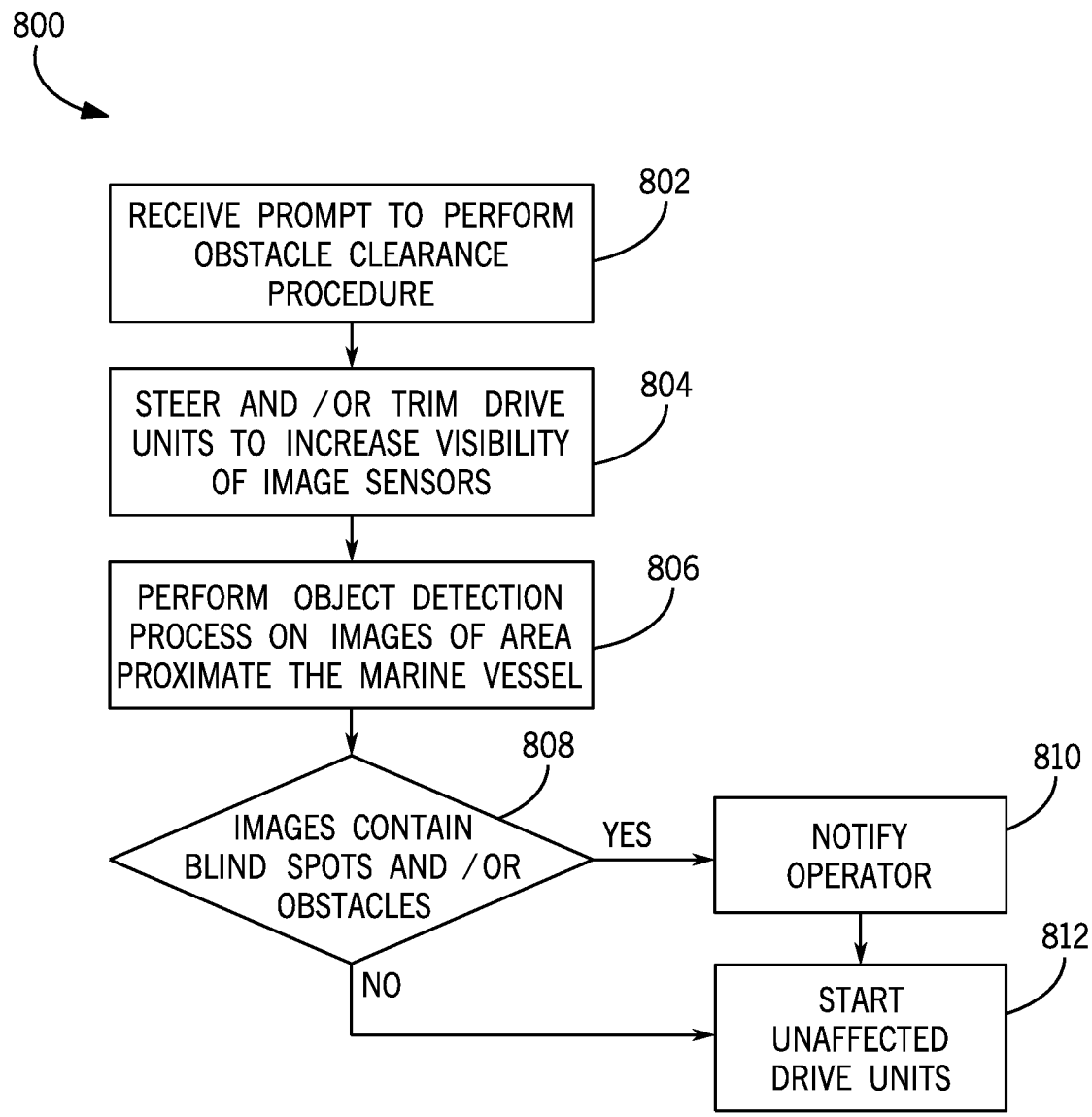
FIG. 8 illustrates a method for performing an obstacle clearance and object detection procedure using the marine vessel of FIG. 1.

Referring now to FIG. 8, a method 800 for performing an obstacle clearance and object detection procedure is shown. In an exemplary embodiment, the method 800 is performed by the controller 62. The method 800 may be utilized with any number of drive units 12-18 installed on the marine vessel 10, and may be performed independently for each drive unit 12-18, for a subset of the drive units 12-18, or for all of the drive units 12-18 on the marine vessel 10.

Method 800 commences with step 802, in which the controller 62 receives a prompt to perform an obstacle clearance procedure to increase the visibility by the image sensors 36, 38 of the area around the drive units 12-18 and behind the marine vessel 10. A variety of actions may initiate the obstacle clearance procedure at step 802, including, but not limited to, key-up of the marine vessel 10, an operator request to perform an obstacle clearance procedure received at a user interface of the display device 66, entry into an autonomous control mode, movement of a steering wheel, and movement of a control lever causing the drive units 12-18 to enter forward or reverse gear. In other words, the obstacle clearance procedure may be initiated at any point in the operation of the marine vessel 10 in which startup of the propellers of the drive units could cause injury to a person, damage to the marine vessel 10, or damage to the surroundings (e.g., dock structures).

At step 804, the controller 62 operates the drive units 12-18 to steer and/or trim about their respective steering and/or trim axes to increase the visibility of the areas behind the marine vessel surrounding the drive units 12-18 to the image sensors 36, 38. As described above with reference to FIGS. 3-7, step 804 may comprise steering each of the drive units 12-18 toward a first direction simultaneously, and then sequentially steering each of the drive units toward a second direction. In another implementation, each of the drive units 12-18 may be steered toward a first direction sequentially, and then steered toward a second direction simultaneously. Movement of the drive units 12-18 in this way causes areas that would otherwise be blocked from the FOVs of the image sensors 36, 38 to be imaged.

Continuing with step 806, the controller 62 performs object detection processes on the images received from the image sensors 36, 38. The object detection system may be the object detection system described in U.S. Pat. No. 10,372,976, incorporated herein by reference. If, at step 808, the controller 62 determines that blind spots and/or obstacles are present in the images received from the image sensors 36, 38, method 800 advances to step 810.

At step 810, the controller 62 notifies the operator that blind spots and/or obstacles are detected in the images received from the image sensors 36, 38. In some implementations, the display device 66 may display the combined image captured by the image sensors 36, 38 with highlighted or outlined regions indicating the blind spots and/or obstacles detected in the combined image. For example, the controller 62 may annotate the combined image on the display device 66 such that blind spot regions are highlighted in red and regions that are free of blind spots are highlighted in green. In addition to the combined image, the display device 66 may depict a top down view of the vessel to aid the operator in viewing regions containing blind spots and/or obstacles. The display device 66 may also be configured to emit an audible alert when blind spots and/or obstacles are detected.

In some implementations, if the combined image includes blind spots proximate the drive units 12-18, the controller 62 may perform additional obstacle clearance procedures to steer and/or trim the drive units 12-18, for example, commanding the drive units 12-18 to steer to different steering angles and/or trim to different trim angles. If the blind spots cannot be eliminated via obstacle clearance procedures, step 810 may further comprise an alert message generated by the controller 62 and displayed on the display device 66 prompting the operator to manually verify that the areas surrounding the drive units 12-18 are free of people and obstructions. The prompt to the operator to perform manual verification may be based on a threshold size of the blind spot as determined by the controller 62. For example, if the detected blind spot is larger than the size of a beach ball, the controller 62 may command the display device 66 to prompt manual verification. If the blind spots and/or obstacles persist, the controller 62 may command only the drive units unaffected by the blind sports and/or obstacles to start at step 812. For example, if image sensor 36 is unable to fully image the area surrounding drive unit 12, the controller 62 may command only drive units 14-18 to startup. However, returning to step 808, if the controller 62 determines that the images received from the image sensors 36, 38 do not contain blind spots or obstacles within a predetermined threshold distance of the drive units 12-18, method 800 concludes with step 812 by starting the unaffected drive units, which, due to the lack of detected blind spots and obstacles means that the unaffected drive units comprises each of the drive units 12-18.

This written description uses examples to disclose the invention, including the best mode, and to enable any person skilled in the art to make and use the invention. Certain terms have been used for brevity, clarity and understanding. No unnecessary limitations are to be inferred therefrom beyond the requirement of the prior art because such terms are used for descriptive purposes only and are intended to be broadly construed. The patentable scope of the invention is defined by the claims, and may include other examples that occur to those skilled in the art. Such other examples are intended to be within the scope of the claims if they have features or structural elements that do not differ from the literal language of the claims, or if they include equivalent features or structural elements with insubstantial differences from the literal languages of the claims.

We claim:

1. A propulsion control system for a marine vessel comprising:
   at least one image sensor positioned on the marine vessel and configured to image an area behind the marine vessel;
   a plurality of drive units configured to propel the marine vessel, wherein each of the plurality of drive units is steerable about a vertical steering axis;
   a controller configured to:
      receive a prompt to perform an obstacle clearance procedure; and
      in response to the prompt, steer at least one of the plurality of drive units about its vertical steering axis to increase visibility to the at least one image sensor of the area behind the marine vessel obscured by the at least one of the plurality of drive units.

2. The propulsion control system of claim 1, wherein the prompt to perform the obstacle clearance procedure is a key-up of the marine vessel.

3. The propulsion control system of claim 1, wherein the prompt to perform the obstacle clearance procedure is a signal from a command lever to move at least one of the plurality of drive units into a forward gear or a reverse gear.

4. The propulsion control system of claim 1, wherein the prompt to perform the obstacle clearance procedure is an operator request input at a user interface.

5. The propulsion control system of claim 4, wherein the operator request input is a request to enter an autonomous mode.

6. The propulsion control system of claim 1, wherein steering at least one of the plurality of drive units comprises:
   steering each of the plurality of drive units to a first steering angle in a first direction; and
   steering each of the plurality of drive units to a second steering angle in a second direction.

7. The propulsion control system of claim 6, wherein at least one of the first steering angle and the second steering angle comprises a maximum steering angle.

8. The propulsion control system of claim 6, wherein at least one of the first steering angle and the second steering angle comprises a steering angle oriented toward one of the at least one image sensor.

9. The propulsion control system of claim 6, wherein each of the plurality of drive units are steered to the first steering angle in the first direction or the second steering angle in the second direction simultaneously.

10. The propulsion control system of claim 6, wherein each of the plurality of drive units are steered to the first steering angle in the first direction or the second steering angle in the second direction sequentially.

11. The propulsion control system of claim 1, wherein the at least one image sensor is mounted on a hardtop of the marine vessel.

12. The propulsion control system of claim 1, wherein each of the plurality of drive units is trimmable about a horizontal trim axis, and wherein the controller is further configured to operate at least one of the plurality of drive units to trim about its horizontal trim axis to increase visibility of the area behind the marine vessel by the image sensor.

13. The propulsion control system of claim 1, wherein the controller is further configured to:
   perform an object detection process on images of the area behind the marine vessel; and
   start at least one of the plurality of drive units based on a result of the object detection process.

14. A method for improving imaging of an area behind a marine vessel having a plurality of drive units wherein each of the plurality of drive units is steerable about a vertical steering axis and/or trimmable about a horizontal trim axis, the method comprising:
   receiving a prompt to perform an obstacle clearance procedure;
   in response to the prompt, operating at least one of the plurality of drive units to steer about its vertical steering axis and/or trim about its horizontal trim axis to increase visibility to at least one image sensor positioned on the marine vessel of the area behind the marine vessel obscured by the at least one of the plurality of drive units; and
   generating images of the area behind the marine vessel using the at least one image sensor.

15. The method of claim 14, wherein the method further comprises:
   performing an object detection process on the images of the area behind the marine vessel; and
   starting at least one of the plurality of drive units based on the object detection process.

16. The method of claim 14, further comprising:
   determining whether the images of the area behind the marine vessel are free of blind spots; and
   in response to a determination that the images of the area proximate the marine vessel contain blind spots, transmitting an alert message to an operator.

17. The method of claim 14, wherein operating at least one of the plurality of drive units to steer about its vertical axis comprises:
   steering each of the plurality of drive units to a first steering angle in a first direction; and
   steering each of the plurality of drive units to a second steering angle in a second direction.

18. The method of claim 17, wherein each of the plurality of drive units are steered to the first steering angle in the first direction or the second steering angle in the second direction simultaneously.

19. The method of claim 17, wherein each of the plurality of drive units are steered to the second steering angle in the second direction sequentially.

20. The method of claim 14, wherein the prompt to perform the obstacle clearance procedure is at least one of a key-up of the marine vessel, a signal from a command lever to move at least one of the plurality of drive units into a forward gear or a reverse gear, an operator request input at a user interface, and a request to enter an autonomous mode.

* * * * *